Oct. 30, 1951
O. A. SHANN
2,573,617
TELEPHONE DIAL LAMP
Original Filed Jan. 20, 1945
FIG. 1
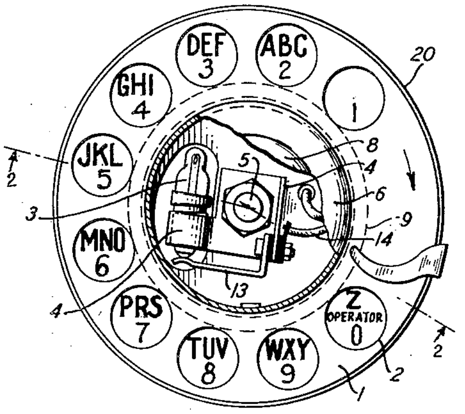
FIG. 2
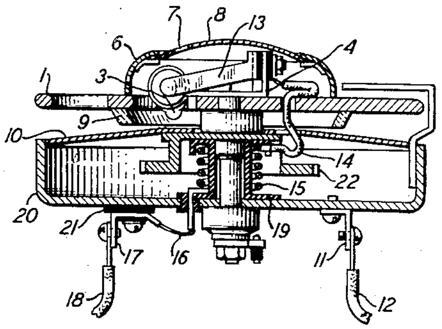
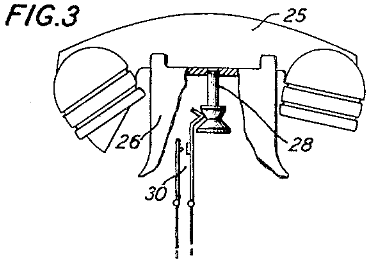
FIG. 4
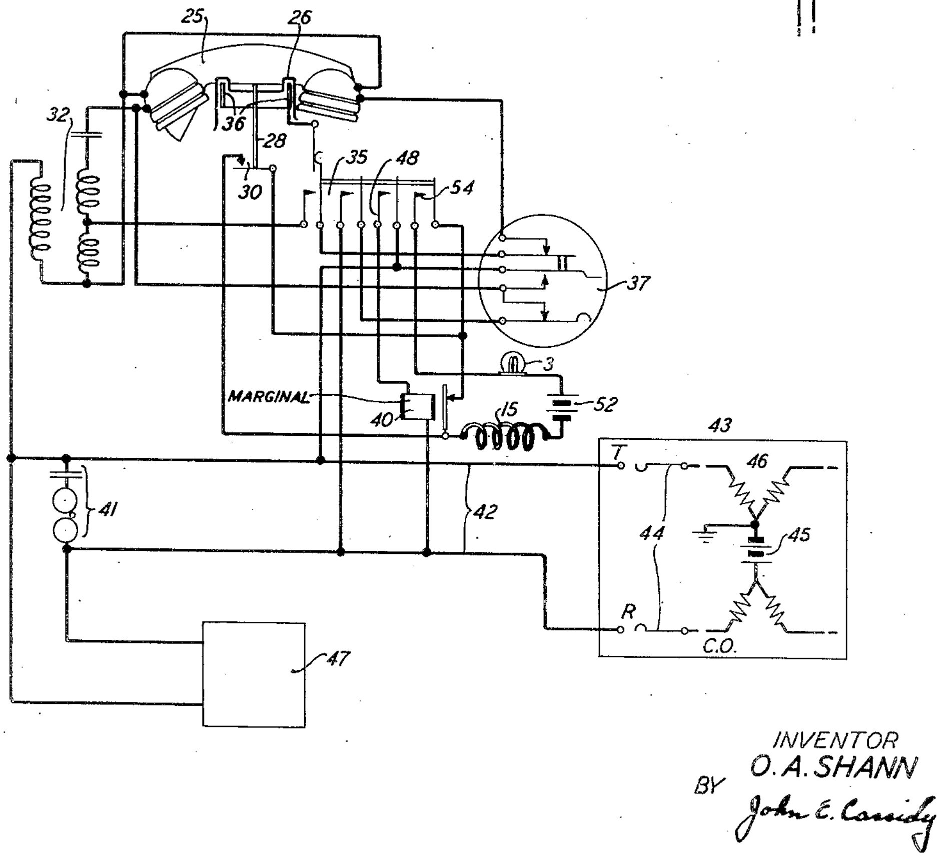
INVENTOR
O. A. SHANN
BY John E. Cassidy
ATTORNEY Patented Oct. 30, 1951 2,573,617

UNITED STATES PATENT OFFICE 2,573,617

TELEPHONE DIAL LAMP

Oscar A. Shann, Short Hills, N. J., assignor to Bell Telephone Laboratories, Incorporated, New York, N. Y., a corporation of New York Original application January 20, 1945, Serial No. 573,735. Divided and this application July 12, 1949, Serial No. 104,179

4 Claims. (Cl. 179—81)

This invention relates to telephone systems and apparatus and particularly to improvements at subscribers' telephone stations. The present invention was originally included in my copending application, Serial No. 573,735, Oscar A. Shann, filed January 20, 1945, now Patent No. 2,496,642, granted February 7, 1950, of which the present application constitutes a division with benefit of all legal and equitable rights derivable therefrom.

An object is to facilitate the operative control by subscribers over telephone connections established through their telephone apparatus.

Heretofore subscriber's apparatus in telephone systems has been provided with various types of signals for illuminating the station apparatus to facilitate the dialing of a connection or for other purposes. In some instances a lamp was provided in the dial structure which was lighted on the seizure of the telephone by the subscriber to establish a connection for illuminating the dial legends by direct or reflected light beams. In some cases the light source was stationary mounted at the side of the finger wheel on the dial structure to permit its beam to be directed through a prism or a reflecting surface on the dial legends or through the dial wheel itself when made from a translucent material.

It is in general in connection with such lighting means that the present invention is concerned with regard to one of its features. This feature consists of a lamp mounted on the dial wheel itself and a reflecting means also mounted directly on the dial wheel whereby light from the lamp is reflected onto the dial figures and circuit means including a plunger inside the cradle of the desk stand whereby when the handset is removed from the cradle and the plunger is lifted the lamp may be lighted.

Another feature is an arrangement for further controlling this lamp to act as a pilot signal for indicating to a subscriber at one station while his telephone is connected over his line to the central office when the party at an extension station on the same line removes his handset from the cradle to listen in.

Thus this signal may serve the dual purpose of illuminating the dial wheel for dialing and for signaling at a master station when an extension station engages the same line.

The invention has been illustrated in the accompanying drawings in which:

Fig. 1 shows a front view of a typical dial mechanism for establishing connections at the central office with the applicant's invention applied thereto;

Fig. 2 is a cross-section taken on line 2—2 of Fig. 1;

Fig. 3 shows a portion of a desk stand cradle and a typical handset resting therein with the applicant's invention applied thereto; and Fig. 4 shows a circuit diagram in accordance with the applicant's invention as applied to typical substation apparatus indicated diagrammatically.

Referring now to the drawings, Figs. 1 and 2, a finger wheel 1 is shown having the usual openings 2 through which the dial figures are visible. This figure also shows the mounting of the lamp 3 in a bracket 4 connected to the central movable shaft 5 on which the finger wheel is mounted. This lamp bracket may be covered by the usual number plate holder 6, so as to entirely cover the lamp and the bracket with the exception of a small opening or window 7 in the number plate 8 to permit light from the lamp 3 to shine out towards the front of the dial. The finger wheel 1 is provided on its underside with a translucent ring 9 through which light from the lamp 3 may be transmitted to the number plate 10. The bracket 4 in which the lamp is mounted provides one connection for the filament in the lamp which extends through the metal parts of the dial including the shaft 5 to an outside terminal 11 and a conductor 12, while the other connection for the filament is extended from the bottom of the lamp to a bracket 13 insulatedly connected to the mounting bracket 4. This bracket 13 is connected by a conductor 14 through the usual return spring 15 for returning the dial to normal and through another conductor 16 to a terminal 17 and a conductor 18 to the outside of the dial. The spring 15 is insulated from the dial by an insulating bushing 19 and the terminal 17 is insulated from the cover 10 by washers 21. The inside mechanism of this dial has been merely indicated by a gear wheel 22, while the remaining elements of the dial structure, being well known, are omitted.

Fig. 3 shows a handset 25 mounted in a cradle 26 which has merely been shown fragmentarily as it forms part of any standard desk stand well known in the art. The difference between the standard desk stand and the desk stand required to carry out the applicant's invention is a plunger 28 mounted in the center of the cradle under the handset 25. This plunger when lifted by hand after the handset is removed from the cradle may be constructed so as to close a set of contacts 30, the purpose of which will be described hereinafter.

Fig. 4 shows a circuit diagram for the carrying out of the applicant's invention. It consists in general of the standard telephone equipment as a master station including the handset 25, an induction coil 32 and line switch contacts 35 controlled by the usual plungers 36 located in the cradle and associated lever mechanism which, when the handset is lifted from the cradle, operate the line switch contacts 35 and a series of other contacts added to carry out the applicant's invention. The usual contacts of the dial have been shown in diagrammatic form at 37. The lamp 3 mounted in the finger wheel has been shown and a special marginal relay 40 is provided for carrying out the applicant's invention. The usual ringer and condenser are shown at 41. This telephone circuit at the master station is connected to a pair of line conductors 42 leading to terminals in the central office 43 and terminate in the usual line finder 44, the brushes of which lead to a source of current 45 through the usual repeating coil 46. The circuit and equipment at the central office are shown merely in diagrammatic form. The line 42 also extends to an extension station 47 which has been indicated merely by a box.

The invention illustrated in these drawings operates as follows. If the subscriber at the master station lifts his handset 25 from the cradle 26, the line switch contacts 35 are operated to establish a connection to the central office 43 over the line 42 through the line finder 44 and from there in the usual manner to the source of current 45. As this connection is established, the relay 40 is operated from the source of current 45 over the line conductors 42 through the winding of this relay 40 and contacts 48 that are closed at this time. The operation of this relay 40 opens a circuit for the lamp 3 which would be closed on the lifting of the handset from the cradle from the local source of battery 52, that may be located in the desk stand for supplying current to this lamp. The lamp 3 will therefore not have time to light at this time. However, if the subscriber desires to illuminate the dial, he will lift the plunger 28, and close the connection through contacts 30 and thereby provide a lighting circuit for the lamp 3 from battery 52, the motor spring 15, contacts 30, contacts 54, lamp 3 back to battery 52. The light from the lamp 3 will illuminate the prism or translucent reflecting ring 9 and be reflected onto the dial legends imprinted on the plate 10 and thus illuminate these legends for the dialing of the connection by the subscriber. After dialing the subscriber may depress the plunger 28 to open the connection for the lamp and extinguish it. Now while the master station subscriber is engaged in conversation over the line 42, if the party at the extension station 47 lifts his handset from the desk stand, a circuit is completed through his telephone circuit in the usual manner and establishes a shunt across the line sufficient to permit the marginal relay 40 to release. The release of this relay now closes a connection for lamp 3 from battery 52, motor spring 15, contact of relay 40, contact 54 and lamp 3 back to battery 52. The light from this lamp besides illuminating the dial figures shines through the opening 8 in the number plate to indicate to the subscriber that the extension station subscriber has established a connection to this line. Thus in accordance with the applicant's invention the lamp 3 serves the dual purpose of illuminating the dial legends for dialing, and also indicates when an extension station establishes a connection to the line 42 over which the master station is connected to a central office.

What is claimed is:

1. A telephone dial having a finger wheel and a spring for returning the finger wheel to normal, a lamp mounted on the finger wheel for rotation therewith, means mounted on the finger wheel for rotation therewith for reflecting light from said lamp when lighted onto the dial figures of said dial, means for insulating the spring from the dial, and means including a circuit connection from the dial structure through the filament of the lamp and said insulated spring for lighting said lamp.

2. A telephone dial having a finger wheel and an insulated spring for returning said finger wheel to normal, a lamp mounted on said finger wheel, a light reflecting member, mounted on said finger wheel between said finger wheel and dial figures on said dial for reflecting light from said lamp when lighted onto said dial figures and circuit connections for the filament of said lamp extending through said insulated spring.

3. In a telephone system, a desk stand including a handset, a cradle in which said handset normally rests, a dial having a finger wheel and a spring for returning said finger wheel to normal and means for insulating said spring from other parts of said dial, a lamp mounted in said finger wheel, reflecting means mounted on said finger wheel for reflecting light from said lamp to the dial figures when said lamp is lighted, a set of springs in said stand and a plunger in said stand, operative by hand after said handset is removed from said cradle, for actuating said springs, and means for lighting said lamp, including a circuit through the dial structure, the filament of said lamp, the insulated springs and said contact springs, when actuated by said plunger.

4. A subscriber telephone set having a rotatable dial finger wheel, a coiled spring connected to said wheel for rotating said wheel, an electric lamp rotatable with said wheel, and an electric power supply circuit extending through said spring to said lamp.

OSCAR A. SHANN.

REFERENCES CITED

The following references are of record in the file of this patent:

UNITED STATES PATENTS

| Number | Name | Date |
|---|---|---|
| 1,100,480 | Haralson et al. | June 16, 1914 |
| 1,247,672 | Hallberg | Nov. 27, 1917 |
| 1,676,392 | Ide | July 10, 1928 |
| 1,955,972 | Muse | Apr. 24, 1934 |
| 1,971,272 | Miyenatsu | Aug. 21, 1934 |
| 1,985,172 | Keller | Dec. 18, 1934 |
| 2,222,476 | Caroselli | Nov. 19, 1940 |